United States Patent [19]

Nishiyama

[11] Patent Number: 5,586,208

[45] Date of Patent: Dec. 17, 1996

[54] ANALOG PHOTODIODE MODULE

[75] Inventor: Naoki Nishiyama, Yokohama, Japan

[73] Assignee: Sumitomo Electric Industries, Ltd., Osaka, Japan

[21] Appl. No.: 383,565

[22] Filed: Feb. 3, 1995

[30] Foreign Application Priority Data

Jun. 29, 1994 [JP] Japan ................................. 6-171873

[51] Int. Cl.$^6$ ............................................. G02B 6/42
[52] U.S. Cl. .................. 385/93; 385/92; 385/88; 385/90; 385/91
[58] Field of Search .......................... 385/88–94

[56] References Cited

U.S. PATENT DOCUMENTS

| | | | |
|---|---|---|---|
| 4,383,731 | 5/1983 | Simon et al. ...................... | 385/93 X |
| 5,107,537 | 4/1992 | Schriks et al. ..................... | 385/91 |
| 5,119,462 | 6/1992 | Matsubara et al. ................. | 385/93 |
| 5,347,604 | 9/1994 | Go et al. ........................... | 385/92 |

OTHER PUBLICATIONS

Takada et al, "A Photodiode Module for an Analog CATV Application", 1990 Autumn National Convention Record, The Institute of Electronics, Information and Communication Engineers, pp. 4–69 (English Translation also enclosed).

Kusakabe et al, "Pin–PD Module for Analog CATV Transmission", 1991 Spring National Conention Record, The Institute of Electronics, Information and Communication Engineers, pp. 4–197 (English Translation also enclosed).

Primary Examiner—Rodney B. Bovernick
Assistant Examiner—Phan T. H. Palmer
Attorney, Agent, or Firm—Cushman Darby & Cushman, L.L.P.

[57] ABSTRACT

An analog photodiode (PD) module converts light including many AM signals of different frequencies into electric signals. It is desirable to suppress the distortion caused by the non-linearlity of the light-current conversion in the PD module as completely as possible. Extreme convergence of beams enhances the sensitivity but raises the distortion. Prior modules suppressed the distortion at an expense of the sensitivity. The present invention overcomes this problem by positioning the end of the fiber at a point which is closer to the lens than the maximum sensitivity range, thereby providing a distortion that is smaller than the predetermined value. The high sensitivity and the low distortion are compatible at the point.

25 Claims, 7 Drawing Sheets

ANALOG PHOTODIODE MODULE

FIELD OF THE INVENTION

This invention relates to an analog photodiode module utilized in the field of optoelectronic communication. Broadcasting of cable televisions involves the transmission of electric signals through coaxial cables. Recent prevalence of cable televisions demands that broadcasting be extended to far more channels and wider areas.

Since the broadcasting signals include a large amount of information, electric cables are incapable of sending still more channels to far wider areas because of the restrictions of both cost and technology.

BACKGROUND OF THE INVENTION

This invention claims the priority of Japanese Patent Application No. 171873/1994 filed Jun. 29, 1994, now abandonment which is incorporated herein by reference.

Instead of utilizing electric cables, optoelectronic achieves transmission through optical fibers. Optoelectronic transmission is promising for increasing the number of channels and receiving areas. The optoelectronic communication system adopts a laser as a light source because of the high stability of the light wavelength. The laser converts electric signals into light signals in the system. The optoelectronic system employs amplitude-modulation (AM) for transmitting information riding thereon instead of frequency modulation (FM) or phase-modulation (PM). Namely, the power of the light beams emitted from the laser is changed in an analog manner in accordance with the signals. There are two ways for modulating the light power. An inner modulation varies the injection current of the laser itself. An outer modulation utilizes a modulator for varying the power of the light beams. The light beams emitted from the laser are introduced into an optical fiber. A transmitting station gathers a plurality of signals from different channels having different carrier frequencies in the transmitting station. The sum of the signals is transmitted through an optical fiber from the transmitting station to receivers.

The single optical fiber can transmit a plurality of signals of different frequencies which are individually modulated in an analog manner. Every channel is allocated to one of the transmitting frequencies. Thus the number of the frequencies is equal to the number of the channels. The difference of the frequency prevents the signals of different channels from mingling with each other. A receiver obtains the signal of the desired channel by receiving the optical signal from the fiber, converting the optical signals to electrical signals by a photodiode, and selecting (by a tuner) one channel which the listener wishes by the difference of the frequencies.

One optical fiber is sometimes assigned to several tens to several hundreds of channels. For transmitting many channels, the effect of non-linearity should be reduced in the transmitting device and the receiving devices. The non-linearlity generates harmonics. The harmonics cause a crosstalk between one channel A and another channel B generating harmonic whose frequency is similar to the frequency of the channel A. Furthermore, beats having a frequency equal to the difference of two frequencies are generated by various harmonics. The beat sometimes incurs unpleasant noises in receivers. Therefore, the non-linearlity causes the noise or the cross-talk between two different channels. What demands the linearity is all the components of the broadcasting station and the receivers, that is, the laser diode module (LD) of the transmitting station, the photodiodes (PD) of the receiving sets, optical fibers and so on. The present invention addresses the problem of the non-linearity of the photodiode modules.

The problem of distortion is explained now. "S" denotes an input signal. "Q" designates an output converted by the photodiode from the input signal S. The output Q can be expanded to $Q=aS+bS^2\ldots$. In this expansion, the second term b induces the second order distortion of signal. The square term $S^2$ generates the second harmonics. When two signals are introduced into the photodiode, a sum frequency and a difference frequency are yielded by the function of the square term $S^2$. The second order distortion is estimated by the quantity obtained by dividing the second harmonic by the fundamental (first order) signal, taking logarithms of the quotient and multiplying it by 20. Thus the second order distortion is denoted by $20 \log (bS/a)$. The quantity is obtained by inputting two signals S and T with different frequencies, and measuring the power of the sum-frequency or the difference-frequency originated from the input signals. The power P of the sum-frequency or the difference-frequency is designated by dBc $(=20 \log P)$. The power W of the original signal S or T is also measured and expressed by dBc$(=20 \log W)$. The second distortion is given by subtracting the latter $20 \log W$ from the former $20 \log P$. The second order distortion $20 \log(P/W)$ is designated by $IMD_2$. The third order term $S^3$ bears the third order distortion $IMD_3$. However, higher order distortions than the second are, in general, too weak to cause the problems. Accordingly, the present object is the second order distortion.

For example, InGaAs pin photodiodes are used as an analog photodiode (PD) for receiving the signals of the present optoelectronic communication which adopts the light of a wavelength between 1.0 μm and 1.3 μm. The InGaAs designates the component of the active layer which is deposited via some other layers on an InP substrate. Fujitsu FID13SK81R-AL, an example of the InGaAs photodiodes, ensures the sensitivity higher than 0.8 A/W, the second order distortion $IMD_2$ less than −75 dBc and the response higher than 1.5 GHz at a 1.3 μm wavelength. The present optoelectronic communication requires the second order distortion less than −75 dBc for analog photodetectors. An example of a conventional photodiode is explained by referring FIG. 7. A package (1) has pins (2), a photodiode chip (3) and a submount (4). The photodiode chip (3) is fitted on the submount (4) which is an insulator plate. A cap (6) with a ball lens (5) covers the package (1). Dry nitrogen gas supplied to the inner space of the cap is sealed. A ferrule (9) holds an end of a single-mode fiber (8). The end of the ferrule (9) together with the fiber (8) are slantingly cut preferably at 8 degrees for preventing the reflected light from returning to the fiber. The ferrule (9) is inserted into a hole of a ferrule holder (10). The holder (10) is positioned and welded to the upper surface of the package (1). The single-mode fiber (8) is drawn out of the ferrule (9). The other end of the fiber (8) communicates with a connector (not shown in the figures). This photodiode module is called a pig-tail type, because a definite length of a fiber projects from the top like a tail of a pig.

For example, a pig-tail type photodetector module of a second order distortion between −80 dBc and −76 dBc was proposed by; Takada, Sato, Yuki, Isaka, Hanamitsu, "Photodetector Module for Analog CATV", Proceedings of the 1990 IEICE Fall Conference V, B-734, p4–69. (IEICE: The Institute of Electronics Information and Communication Engineers)

PROBLEMS TO BE SOLVED

An analog PD (photodiode) module receives numerous analog light signals having different modulation frequencies. It is essential to select only one channel without receiving cross-talk from other unselected channels. For achieving this result, the photodiode module has to convert the light signals into electric signals with high fidelity. Therefore, the distortion property is regarded as a matter of importance for analog PD modules.

The distortion of a PD module originates from the non-linearlity of the light-current conversion of the PD. Non-linearlity induces the second harmonic, or the third harmonic having a frequency twice or three times as high as the original signal, when the photodiode transduces the light signals to current signals. The analog optoelectronic communication introduces numerous analog signals to an optical fiber. The distortion of a PD module causes interference between the different channels and degrades the quality of the transmitted signals. Thus the suppression of distortion is one of the most important requirements.

Some improvements have been suggested to reduce the second order distortion of analog PD modules. One improvement is thinning of the light absorption layer. Conventional photodiodes have a light absorption layer of a 3.5 μm thickness. The improvement thins the absorption layer to about 2.5 μm in order to suppress the distortion. The other improvement is enlarging the distance between the lens and the fiber end for reducing the light power entering the photodiode, which shall be explained in detail later.

The first improvement of thinning the absorbing layer has been proposed by; Kusakabe, Matsuzawa, Sugita, Inomoto, Kosuge, Hasumi & Ohshima, "PIN-PD module for Analog CATV", Proceedings of the 1991 IEICE Spring Conference, C-180, p4–197.

The method grows an $n^-$-InP buffer layer, an $n^-$-InGaAs light absorption layer, an n-InP cap layer successively on an $n^+$-InP substrate, diffuses zinc (Zn) selectively on the n-InP cap layer for making $p^+$ region and forms electrodes on the $n^+$-InP substrate and the $p^+$ region. They adopted a thin absorption layer (about 2.5 μm) for improving the distortion property.

Figure 7:
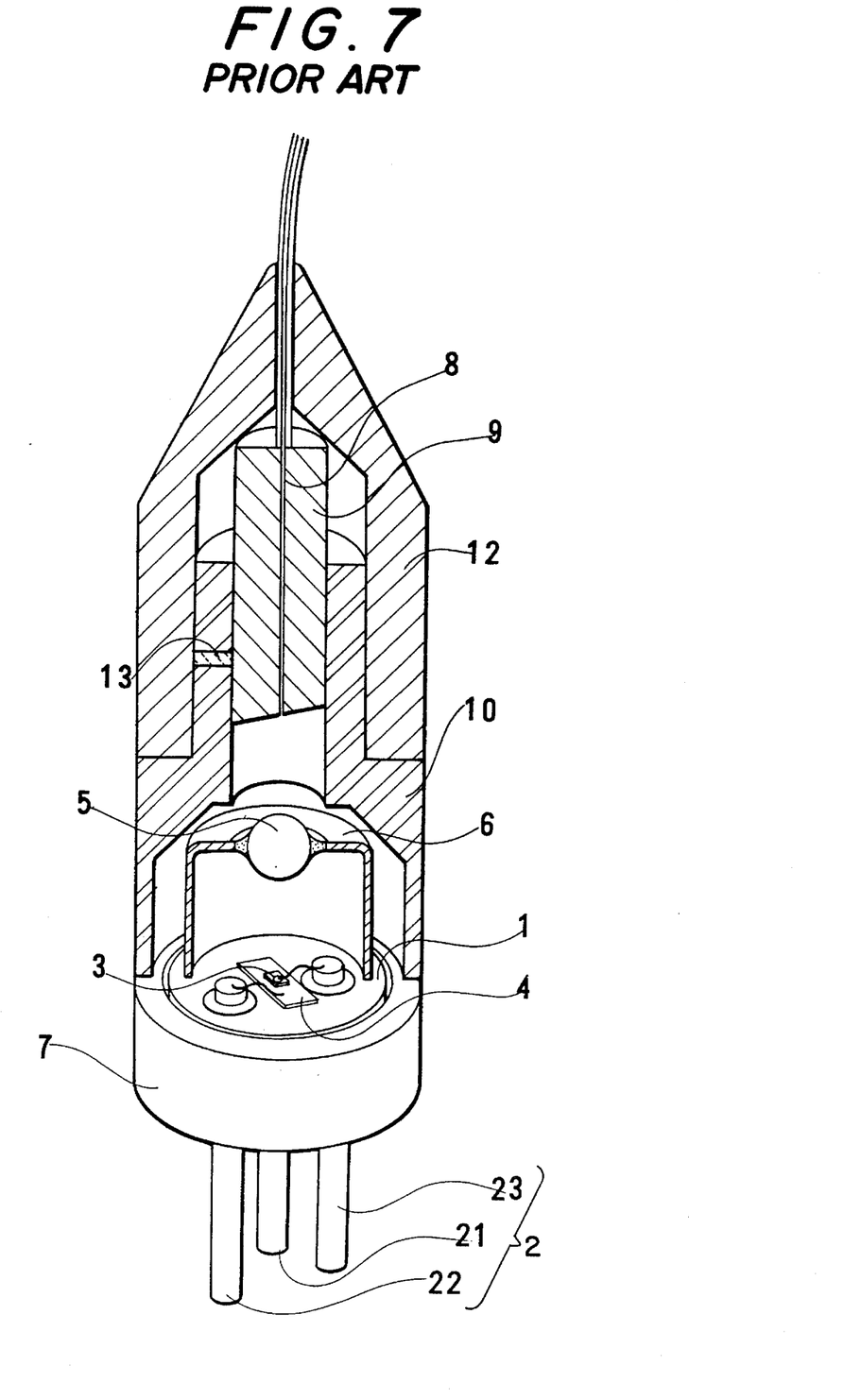
FIG. 7 is a perspective, sectional view of a prior analog photodiode module.
Figure 8:
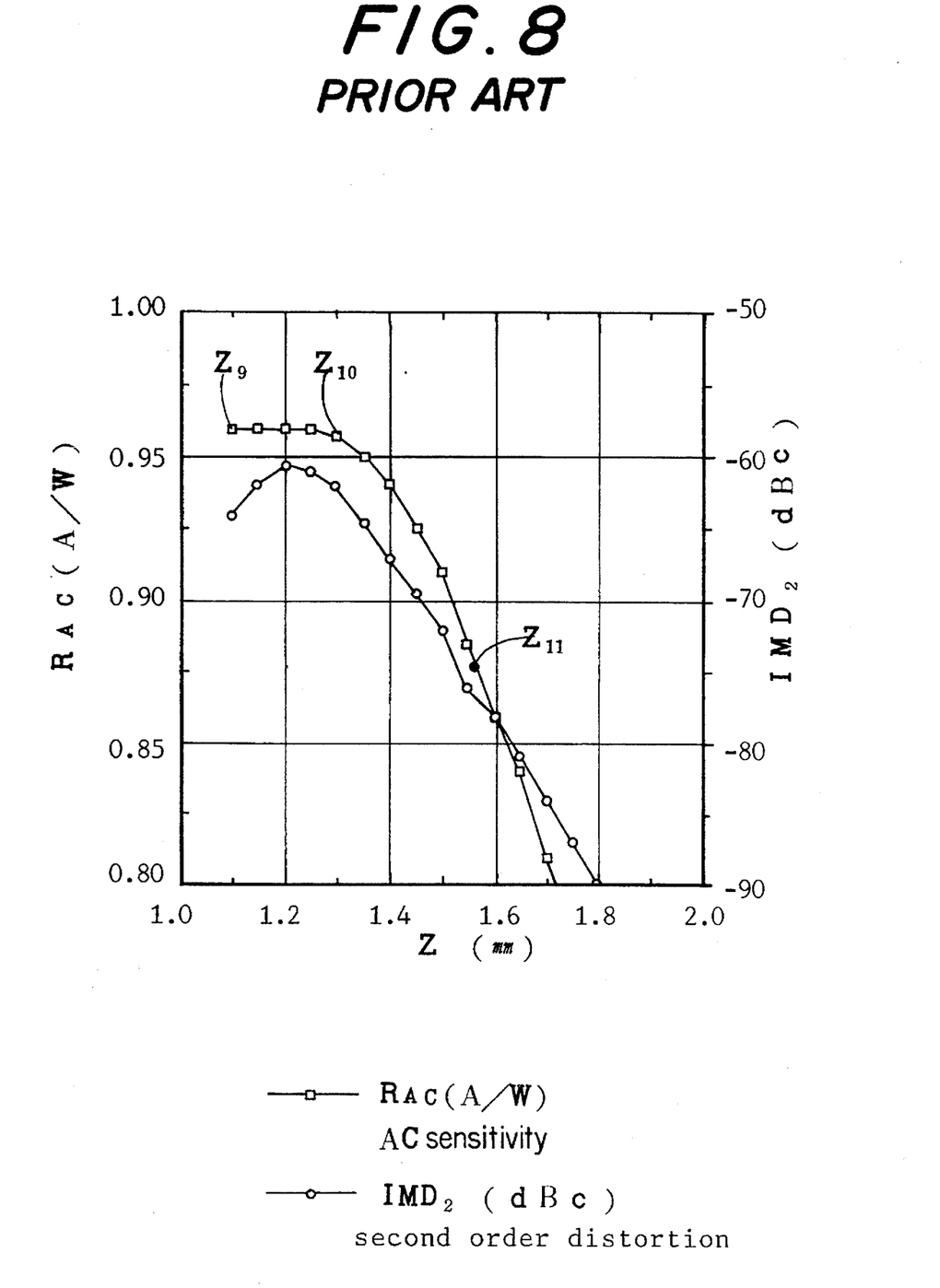
FIG. 8 is a graph showing the relation between the sensitivity $R_{AC}$ and the distance Z and the relation between the second order distortion $IMD_2$ and the distance Z in prior PD module.

The other method attempted to suppress the distortion by increasing the distance between the lens and the fiber end. FIG. 7 and FIG. 8 demonstrate the relations among the distortion, the sensitivity and the distance between the lens and the fiber. The sample PD has an absorption layer of a conventional thickness of about 3.5 μm. Three dimensional coordinate is now defined on the package. XY-plane is the surface of the package. Z-axis is the center axis of the package. The origin of the coordinated is the center of the top surface of the lens. The adjustment of the centers of the analog PD module is carried out by the steps of fixing the submount (4) on the surface of the package, bonding a chip (3) on a submount (4), covering the surface with a cap (6) having a lens (5), inserting a ferrule of a skew-ground end with an optical fiber into a hole of a holder (10), bringing the holder into contact with the package surface, i.e., an XY-plane, moving the holder (10) in the XY-plane for seeking the point at which the photodiode receives the maximum power of the light emitted from the fiber, and welding the holder (10) at the maximum power point on the package (1). The position in the XY-plane has been determined. The fiber axis is now assigned to Z-axis of the coordinate.

Then the ferrule (9) is distanced from a starting point near the lens to an end point in the axial direction further for seeking the point which gives a sufficient power and an allowable distortion in Z-direction. The AC sensitivity ($R_{AC}$) and the second order distortion ($IMD_2$) are measured at several points in Z-direction. FIG. 8 shows the result of the measurement. The origin of the coordinate is set at a surface point on the lens along the power maximum line (Z-axis). The abscissa is the distance Z from the origin (z=0, lens surface) to the end of the fiber in a unit of mm. Namely, Z is the lens-fiber distance. The left ordinate is the AC sensitivity (A/W) and the right ordinate is the second order distortion $IMD_2$ (dBc). Square dotted line denotes the AC sensitivity $R_{AC}$. Round dotted line designates the second order distortion $IMD_2$.

The AC sensitivity takes the maximum of 0.96 A/W between $Z_9$ of 1.1 mm and $Z_{10}$ of 1.3 mm. The reason why a region of some extension gives the maximum sensitivity instead of a spot is that the receiving portion of the PD has a wide diameter e.g. of 80 μmφ. The wide diameter enables all the light beams emitted from the end of the optical fiber to enter the receiving region even if the beams are not fully adjusted on the center line nor perfectly focused at the depth of the center of the receiving region. Thus, even if the beams from the fiber are not fully converged to a point, the PD gives the maximum sensitivity, when all the beams enter the wide receiving region. Thus the region which exhibits the maximum sensitivity has a considerable extension (from $Z_9$ to $Z_{10}$), which is sometimes called a plateau. Sensitivity and distortion were not measured in the region of the distance less than 1.1 mm, since it was assumed that the sensitivity would fall and the distortion would not decrease in the near-lens region. What is sought is the point which gives high sensitivity and sufficiently low distortion.

The region ($Z_9$ to $Z_{10}$) of the maximum sensitivity is afflicted by the big second order distortion between −60 dBc and −65 dBc. An analog PD module requires a second order distortion less than −75 dBc, as mentioned before. The requirement may be alleviated in future. However, $IMD_2$ "less than −75 dBc" is the standard for analog PD modules at present. FIG. 8 shows that the region ($Z_9$ to $Z_{10}$) of the maximum of the sensitivity cannot reduce the second order distortion below −75 dBc. In the conventional PD module, a point of $Z_{11}$=1.56 mm first realizes −75 dBc of the second order distortion $IMD_2$. The AC sensitivity at $Z_{11}$ is 0.87 A/W which is considerably lower than the maximum. Conventional PD modules have determined the position of the fiber end at a point like $Z_{11}$ which is distanced from the lens farther than the maximum sensitivity region. Namely, prior modules sacrifice the sensitivity to suffice the requirement of second order distortion less than −75 dBc. The point of a −75 dBc $IMD_2$ has only the sensitivity of about 90% of the maximum. In the prior PD device, the second order distortion began to fall at a point in the maximum sensitivity region and decreases below −75 dBc at a point outside of the region. The maximum sensitivity was incompatible with the low second order distortion in prior PD devices.

Prior devices contrived to suppress the $IMD_2$ below −75 dBc by displacing the end of the fiber from the lens farther than the maximum sensitivity region. However, the deviation reduces the sensitivity to some extent. The means for decreasing the distortion was always accompanied by the reduction of the sensitivity in the prior signal conversion by PD modules. The improvement of the distortion property was used to invite the decline of the sensitivity. The distortion property and the sensitivity have been incompatible parameters for prior devices.

OBJECTS AND SUMMARY OF THE INVENTION

A purpose of the present invention is to provide a photodiode (PD) module which is capable of improving the distortion property without decreasing the sensitivity. Another purpose of the present invention is to provide a PD module which enables the sensitivity to be compatible with the distortion by generating the region giving IMD$_2$s less than −75 dBc at the region nearer to the lens than the maximum sensitivity point. A further purpose of the invention is to provide a PD module which dispenses with the reduction of the thickness of the light absorption layer, which would lead to the decline of the sensitivity, for the purpose of suppressing IMD$_2$.

The present invention decreases the distortion not by displacing the fiber end beyond the maximum sensitivity point ($Z_0$) but by bringing the fiber end close to the lens over the maximum sensitivity point. The Z coordinate of the fiber end simply satisfies an inequality $Z<Z_0$ in the present invention. On the contrary, prior devices satisfied another inequality $Z_0<Z$.

The Inventors have discovered that IMD$_2$ declines also in the near region which is closer to the lens than the maximum sensitivity region by scrutinizing the dependence of IMD$_2$ on the distance (Z) of current PD modules. The near region has never attracted attentions for the point of the fiber end so far. Furthermore, the Inventors have found out that the point $Z_m$ giving the maximum IMD$_2$ is distanced from the lens farther than the maximum sensitivity point $Z_0$. Namely, $Z_0<Z_m$. The decline of IMD$_2$ is more conspicuous in the nearer region ($Z<Z_0$) which is closer to the lens than $Z_0$ than in the farther region ($Z_0<Z$) which is farther from the lens than $Z_0$. Therefore, in the nearer region ($Z<Z_0$), a rapid fall of IMD$_2$ does occur without degrading the sensitivity so much. There is some region in which the low distortion is compatible with the high sensitivity.

This invention makes the best use of the discovered property of the ball-lens-PD system. The present invention determines a point $Z_2$ which gives a predetermined IMD$_{20}$ in the nearer region closer to the lens than the maximum sensitivity point $Z_0$ and fixes the fiber end at the point $Z_2$ which satisfies the requirements both of the sensitivity and the distortion.

The word "sensitivity" means an AC sensitivity $R_{AC}$ or a DC sensitivity $R_{DC}$. The maximum points of the $R_{AC}$ and $R_{DC}$ nearly coincide with each other. The word sensitivity which has been referred until now includes both the $R_{AC}$ and $R_{DC}$. However, the preferable region of Z (fiber end) becomes slightly different, depending on the definition of the sensitivity. The difference between the definitions by the $R_{AC}$ or the $R_{DC}$ will be explained later.

The functions of the device of the present invention are now clarified. The sensitivity R(z) and the distortion IMD(Z) change as functions of the distance Z between the lens surface and the fiber end. Then "Z" is sometimes called a lens-fiber distance. If the fiber end is positioned at a suitable point, all the beams emitted from the end of the fiber are converged by the lens to the center of the receiving region of the PD chip. The position which enables all the beams to attain the receiving region of the PD enhances the sensitivity of the PD module but raises the distortion at the same time. If the sensitivity perfectly corresponded to the distortion as a function of the distance Z and the maximum sensitivity just coincided with the maximum of the distortion ($Z_0=Z_m$), it would be fully impossible to enhance the sensitivity and reduce the distortion at the same time by adjusting the axial position Z of the fiber end.

However, the Inventors have found out that the maximum point of the sensitivity R(Z) is not exactly equal to the maximum point of the distortion IMD(Z). Experiments taught the Inventors that the maximum distortion point $Z_m$ is distanced from the lens farther than the maximum sensitivity point $Z_0$ ($Z_0<Z_m$). Nobody has reported such a fact until now. Skilled artisans seem to believe the coincidence of the sensitivity and the distortion ($Z_0=Z_m$). This fact ($Z_0<Z_m$) is the result of the repetitions of experiments by the Inventors. This invention will be based upon the newly-discovered discrepancy between the maximum sensitivity and the maximum distortion.

Since the experiments showed the fact, the fact may be adopted for an improvement of a PD module without clarifying the ground. However, it is rather preferable to search the ground of the occurrence of the discrepancy between the IMD(Z) and the R(Z) before applying the fact to the contrivance.

As mentioned before, nobody has ever pointed out the fact that the maximum sensitivity point $Z_0$ deviates from the maximum distortion point $Z_m$ closer to the lens in a PD module. Perhaps no one has noticed the fact yet. The Inventors have considered the fact and have concluded that the following reasons push the maximum distortion point father than the maximum sensitivity point.

If a module adopted a lens without aberration having a definite focus, all the beams going out of the fiber could be gathered to a spot by the lens. The lens would determine a single converging point g. All the diverging beams and the converging beams would form cones perfectly symmetric with regard to the single converging spot g. All the beams would converge within one cone with a top point g. All the beams would diverge in the other cone symmetric with the converging cone. All beams should be symmetric with regard to the point g. Therefore, the adjustment of Z=g would give the largest sensitivity and the biggest distortion. Further, the changes of the sensitivity and the distortion should be entirely symmetric in front of the converging point g and at the back of the point g. Namely, the sensitivity and distortion would be the same for points Z=g+b and Z=g−b i.e., R(g+b)=R(g−b) and IMD(g+b)=IMD(g−b) for an arbitrary b.

However, if the distributions of the converging and diverging beams were entirely symmetric, any deviation of the maximum distortion point from the maximum sensitivity point would never occur. There should be some asymmetry in the forward direction and in the backward direction in the distribution of beams. Bilateral asymmetry could induce such a backward deviation of the maximum IMD from the maximum R. The origin of the bilateral asymmetry, the Inventors suppose, shall be the ball lens.

A PD module employs a ball lens for gathering beams in general. The ball lens is fully isotropic, convenient for handling and inexpensive. Further, the ball lens is endowed with high convergence. The ball lens is superior in many features to the other convex lenses which have two curved surfaces.

However, large aberration is a drawback of the ball lens. The Inventors suspected if the large aberration of the ball lens should invite the backward deviation of the maximum distortion point from the maximum sensitivity point. FIG. 9 shows the distribution of beams generated by a point source and a ball lens. A ball lens makes different converging points for the near-axial beams and for the far-axial beams due to the aberration. The far-axial beams converge earlier. The near-axial beams converge later. The limit of the converging points of the near-axial beams is called Gauss' image plane G. The portion which gives the smallest diameter of the contour of beams is called a circle F of least-confusion. The diameter at the least-confusion circle is sometimes a "beam waist" in short, since it is the minimum of the diameters. The least-confusion circle F is closer to the lens than Gauss' image plane G. The far-axial beams converge at the nearest point E which is closer to the lens further than F. If the Z-coordinates of points are denoted by the names of points themselves, an inequality E<F<G holds for the ball lens convergence. A non-aberration lens could determine a single converging point g which is just the least-confusion circle (shrunk to a spot), the converging point of the near-axis beams and the far axis-beams. However, a ball lens disperses the converging points of beams between the farthest-axis beam converging point E and the nearest-axis beam converging point G. Thus the segment EG of the axial line is an assembly of converging points.

Why is the distortion induced in a photodiode (PD)? What makes the distortion in the semiconductor layers in the PD? This is the next question for the improvement of a PD module. Three grounds have been supposed to cause the distortion.

① Effect of space charges: when big power of light beams enters a photodiode (PD), the strong beams produce high concentration of space charges of electrons or holes. The strong space charges shield electric fields and reduce the mobility of carriers. The reduction of the mobility invites the distortion of the signal. This is called simply a "space charge effect".

② Delay of travelling time: some reason induces a delay of travelling time of the carriers running in the depletion layer.

③ High contact resistance: the contact resistance is born between surfaces of semiconductor and electrodes formed on the surfaces for connecting the device to external circuits. High contact resistance causes the distortion of signals of a PD.

All the grounds degrade the quality of the regenerated signals in photodiodes. However, these grounds are not equivalent to each others for producing the non-linearlity which induces the mutual interference when the PD receives a plurality of signals. ② and ③ appear even at the incidence of the light beams of weak power.

① occurs only when the photodiode receives a high concentration of beams. "D" denotes the diameter of the receiving region (for example, 80 μm). "H" denotes the diameter of beams on the receiving region of the PD. When H is bigger than D (H>D), a part of beams do not enter the receiving (sensitive) region, which reduces the sensitivity. When H is equal to D (H=D), all the beams uniformly enter the whole receiving region. Since the density of the beams is low enough, the space charge density is low in the receiving region. The photons included in the beams make pairs of electrons and holes uniformly in the whole receiving region. The electrons ride on the electric field to the p-side electrode and the holes travel to the n-side electrode.

When the beam diameter H is smaller than the diameter of the receiving region D (H<D) and the incident beams are localized at a narrow spot on the receiving region. The localized convergence produces plenty of pairs of electrons and holes of an extraordinary high concentration, which form a big density of space charges. The space charges invite an abrupt voltage drop there. Since the voltage is wasted at the space charge, a sufficient voltage is not applied to the depletion layer due to the loss at the space charges. The insufficient electric field reduces the travelling speed of the carriers in the depletion layer, which decreases the ratio (I/P) of current I to light P. Namely, the big localized power of light is likely to induce a reduction of the sensitivity which is defined by the ratio I/P. This is a second order effect which invites the non-linearlity. Therefore, a too narrow light spot with high energy density causes the distortion through the space charge effect.

Figure 3:
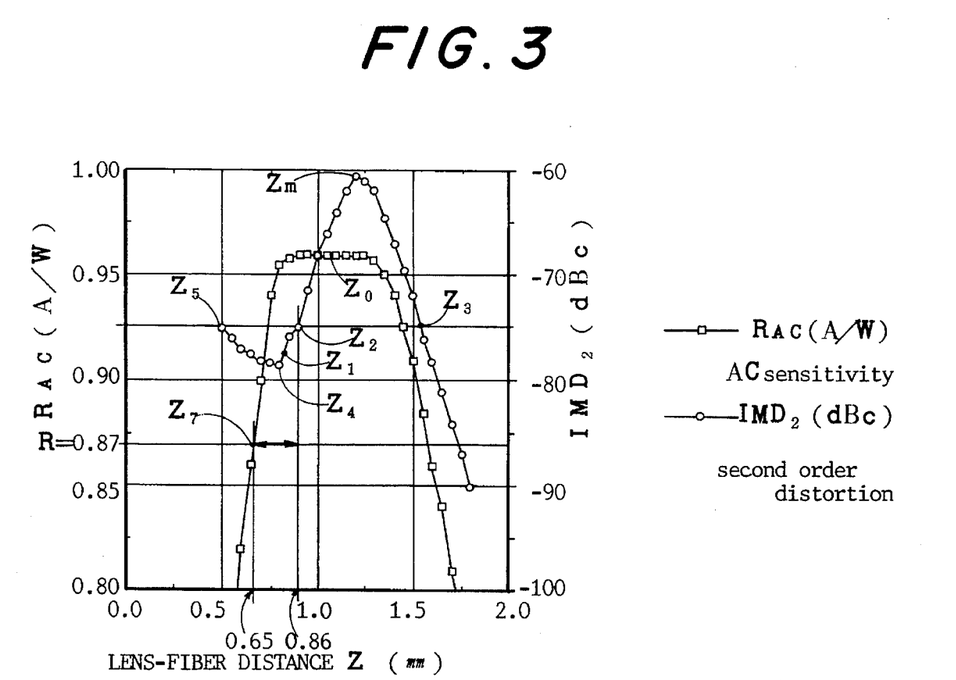
FIG. 3 is a graph showing the relation between the lens-fiber distance Z and the AC sensitivity and the relation between the lens-fiber distance Z and the second order distortion $IMD_2$ in an analog PD module having a ball lens. Round points denote $IMD_2$. Square points designate $R_{AC}$.
Figure 4:
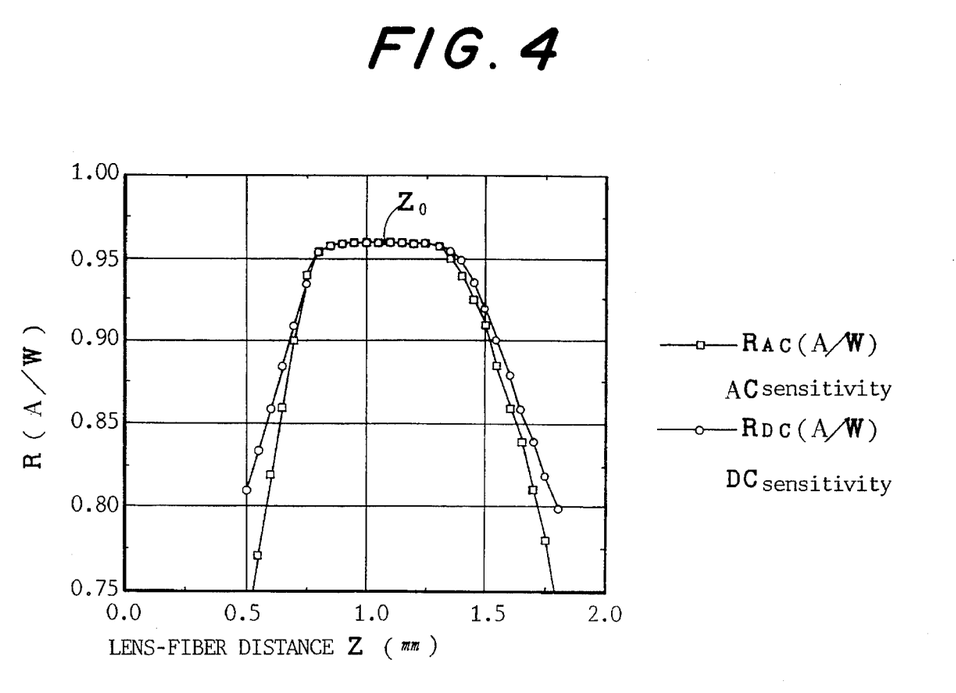
FIG. 4 is a graph showing the $R_{AC}(Z)$ and $R_{DC}(Z)$ as functions of the lens-fiber distance Z in the analog PD module.
Figure 5:
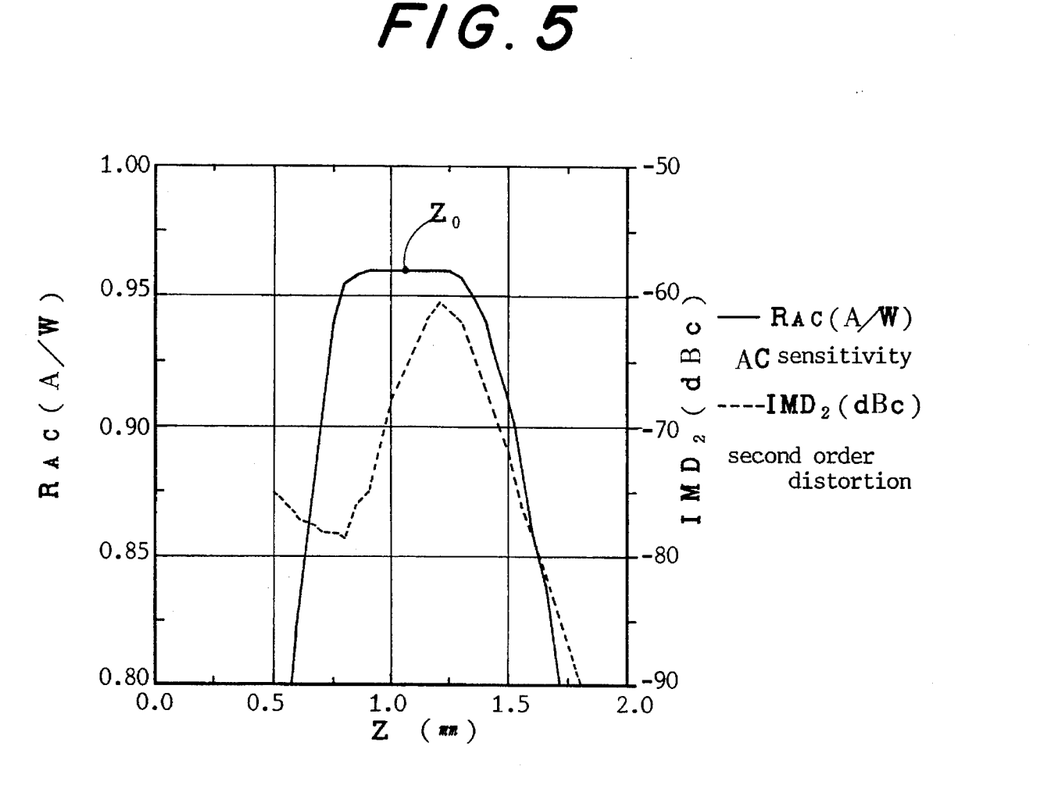
FIG. 5 is a graph showing the changes of the AC sensitivity $R_{AC}(Z)$ and the second order distortion $IMD_2$ (Z) as functions of the lens-fiber distance Z.

Then it matters how is the distribution of the light beams on the receiving surface. When the diameter H of the beam flux is smaller than the reception diameter D (H<D), all the beams are absorbed in the receiving region, which gives the largest sensitivity. Therefore, a wide receiving region broadens the range of the maximum sensitivity. The sensitivity curve has a wide plateau of the maximum sensitivity, as shown in FIG. 3, FIG. 4 and FIG. 5.

The matters are different for the distortion from the sensitivity. Under the same condition of H<D, when the light beams spread uniformly in the reception region, the space charge concentration is low and the distortion scarcely occurs. On the contrary, when the light beams are localized at a small spot on the reception region, high space charge concentration induces a strong distortion of the PD in the same condition of H<D.

Figures 9A, 9B, 9C, 9D, 9E, 9F:
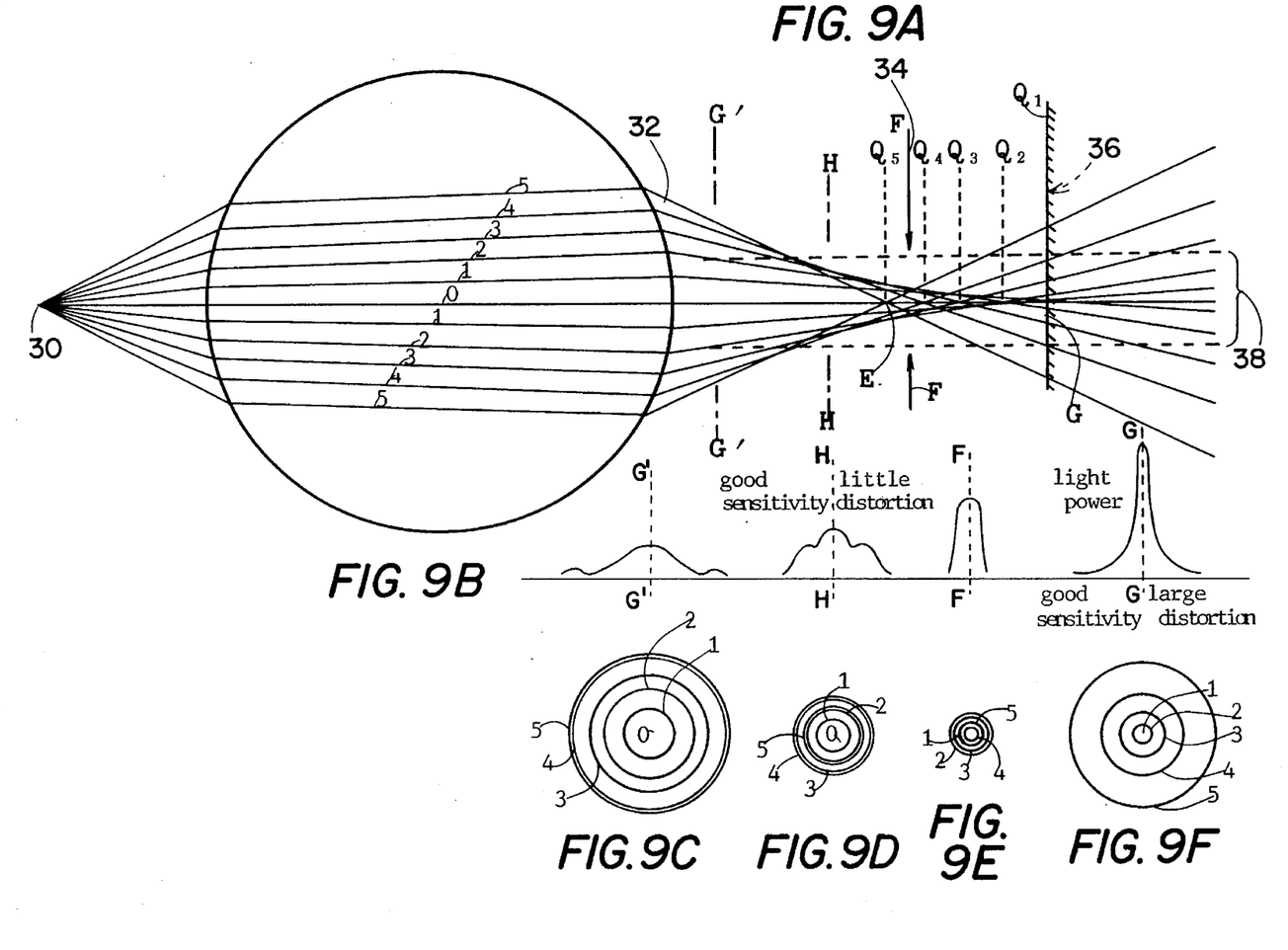
FIGS. 9(A) to 9(F) are explanatory figures showing the convergence of different beams and sections at some points on the axis.

The convergence by a ball lens separates the converging points for near-axis beams from the converging points for far-axis beams. Thus the distribution of beams in the plane perpendicular to the axial line (beam line) complicatedly varies as a function of Z which is the distance from the lens surface. FIGS. 9(A) to 9(F) depicts six pairs of beams which are denoted by numbers 0, 1, 2, 3, 4 and 5 from the center to the periphery. Numeral 0 is the axial beam. Beams 0 and beams 1 are near-axis beams. Beams 4 and beams 5 are far-axis beams. As shown in FIG. 9(A), the beams emanate from a point source (30). Far-axis beams meet the surface of the ball lens with big incident angles which invite large refraction angles at both the forward and backward interfaces of the lens. The large refraction angles make an early crossing point on the axis. The farthest beams 5 make the closest crossing (converging) point $Q_5(E)$. The next farthest beams 4 meet at the second closest point $Q_4$ on the axis. Similarly, the beams 3, 2 and 1 have the crossing points (converging points) $Q_3$, $Q_2$ and $Q_1$ in this order. The limit of the converging point $Q_1$ of the near-axis beams is called Gauss' image plane G (36), as already defined. The converging points satisfy an inequality $E \leq Q_5 < Q_4 < Q_3 < Q_2 < Q_1 \leq G$.

The most external beams among the beams refracted by a lens are called fire lines. The conical contour including all the fire lines is called a fire surface (32). The fire surfaces should be exact cones for a lens without aberration. All fire lines are included in the fire surface. The cross section of the fire surface cut in a plane orthogonal to the axis is a circle which is called a confusion circle. The minimum confusion circle F is called a "least-confusion circle" or a "circle of the least-confusion" (34) in which the beams are concentrated in the highest density.

As shown in FIG. 9(C), which depicts the confusion circle at section G', the order of the beams in the radial direction is the same as the order of the initial beams. As shown in FIG. 9(D), which depicts the confusion circle at section H, beams 4 rise up to the fire surface. Then beams 3 appear on the external surface at the least-confusion circle F which has the narrowest beam flux, as shown in FIG. 9(E). The confusion circle at the Gauss' image plane G is depicted in FIG. 9(F).

Two parallel dotted lines designate the range of the receiving region (38) of the PD. Since the receiving region is wider than the least-confusion circle, all the refracted beams can attain the receiving region located in a considerably wide range on the axis. The maximum sensitivity is accomplished in the range in which the confusion circle is smaller than the receiving region of the PD. Both ends of the range are determined by equalizing the confusion circle with the receiving region. Thus the position giving the maximum sensitivity is not a point but a segment of a line.

Referring to FIG. 9(B), in Gauss' image plane G, the beam distribution has a sharp peak at X=0 and Y=0, because the near-axis beams converge at the spot. The distribution of beams is localized on the axis. The extremely localized beams would induce a strong distortion at Gauss' image. If the receiving region displaces forward toward the lens, the peak of X=0 and Y=0 decreases but the intensity at the middle becomes stronger instead. In the least-confusion circle, the dispersion of beams attains the least value and the distribution of beams is uniform. In section H, the peripheral beams are strong and the distribution of beams is satisfactory uniform.

Gauss' image plane G which is the farthest point in the range in which the beams converge induces the largest fluctuation of the distribution of beams. The beams are localized at a very narrow spot due to the near-axis beams. The high density of the incident beams at the center generates a big concentration of electrons and holes at the center, which yields a strong space charges there. The space charges shield the electric field formed in the depletion layer of the photodiode. The shield of electric field depends on the intensity of the field itself. Thus the higher order effect conspicuously appears at Gauss' image plane. The non-linearlity which is invited by the second order effect is prevailing near Gauss' image plane. Then the distortion grows bigger near the Gauss image plane. Other converging points $Q_3$, $Q_4$, $Q_5$ and H which are closer to the lens than the Gauss image plane G alleviate the non-linear effect due to the low space charge density, because the distribution of beams becomes uniform. Gauss' image plane is surely distanced from the lens farther than the middle point $Z_0$ of the maximum sensitivity range which exists in the vicinity of the least-confusion circle F. If the maximum distortion point $Z_m$ should coincide with Gauss' image plane G or a point near Gauss' image plane, the maximum distortion point $Z_m$ is farther than the middle point $Z_0$ as a matter of course. Therefore, the maximum distortion point deviates in the direction reverse to the lens from the middle point $Z_0$ of the maximum sensitivity range. The Inventors suppose this fact may be the ground of the deviation of the maximum distortion point from the middle of the maximum sensitivity point. The separation of the maximum distortion point from the middle of the highest sensitivity range should originate from the aberration of the ball lens which is typically revealed as the separation of Gauss' image plane from the least-confusion circle.

Prior PD modules suppressed the distortion by positioning the fiber end at a point ($Z_{11}$) distanced from the lens farther than the Gauss image plane G, as shown in FIG. 8 or FIG. 7. Prior devices fixed the fiber end at a point of small distortion behind the Gauss image plane. The long distance from the lens to the fiber end impaired the sensitivity to a great extent. Thus prior PD devices succeeded in repressing the distortion at the expense of the sensitivity.

On the contrary, the present invention seeks a point $Z_1$ of small distortion but of sufficient sensitivity lying before the middle $Z_0$ of the maximum sensitivity range and fixes the fiber end at the point $Z_1$. Therefore the present invention is simply discerned from prior one by an inequality $Z_1 < F < G < Z_{11}$, where $Z_1$ is the position of the fiber end in the present invention, $Z_{11}$ is the position thereof in prior devices, F is the least-confusion circle (middle of the maximum sensitivity range) and G is Gauss' image. What is important is that $Z_1$ is still included in the maximum sensitivity range, since the maximum sensitivity range is wide enough and $Z_1$ is close enough to $Z_0$. $Z_1$ enables the maximum sensitivity to be compatible with the requirement of the small distortion for the first time in PD modules.

The advantage of the present invention is now explained. This invention seeks a critical point $Z_2$ which reduces the distortion down to the prescribed value (i.e. −75 dBc at present) and exists before the middle $Z_0$ of the maximum sensitivity range and fixes the end of a fiber at a point $Z_1$ which is equal to or smaller than $Z_2$ ($Z_1 \leq Z_2$), but is still included in the maximum sensitivity range. This is based upon the fact that the maximum distortion point $Z_m$ is distanced from the lens farther than the middle $Z_0$ of the maximum sensitivity range, which was experimentally discovered by the Inventors for the first time. Since the PD module effectively suppresses the distortion, it is immune from the cross-talk among different frequencies. This invention can provide a high-sensitive PD module of low distortion which is suitable for a photodetector of a receiver of optical fiber communication which carries analog signals of many channels.

DETAILED DESCRIPTION OF THE PREFERRED EMBODIMENTS

Figure 1:
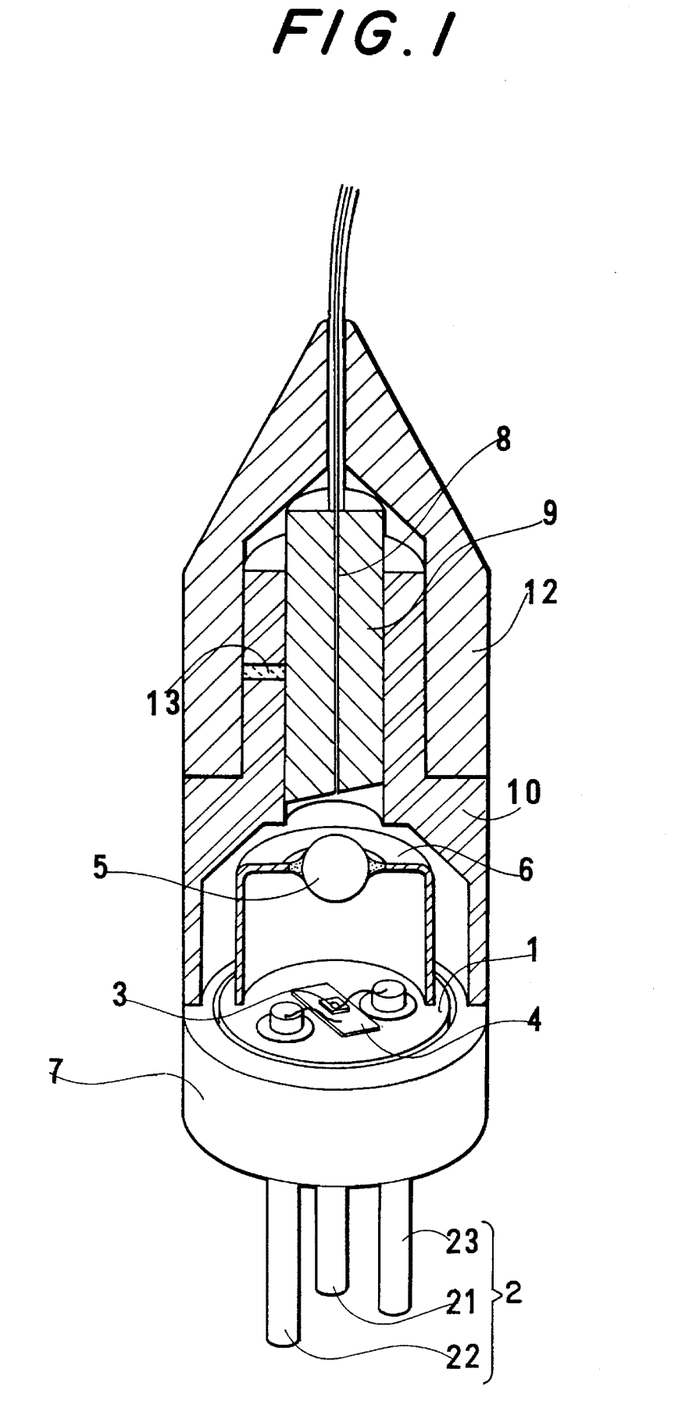
FIG. 1 is a perspective, sectional view of an analog photodiode (PD) module as an embodiment of the present invention.
Figure 2:
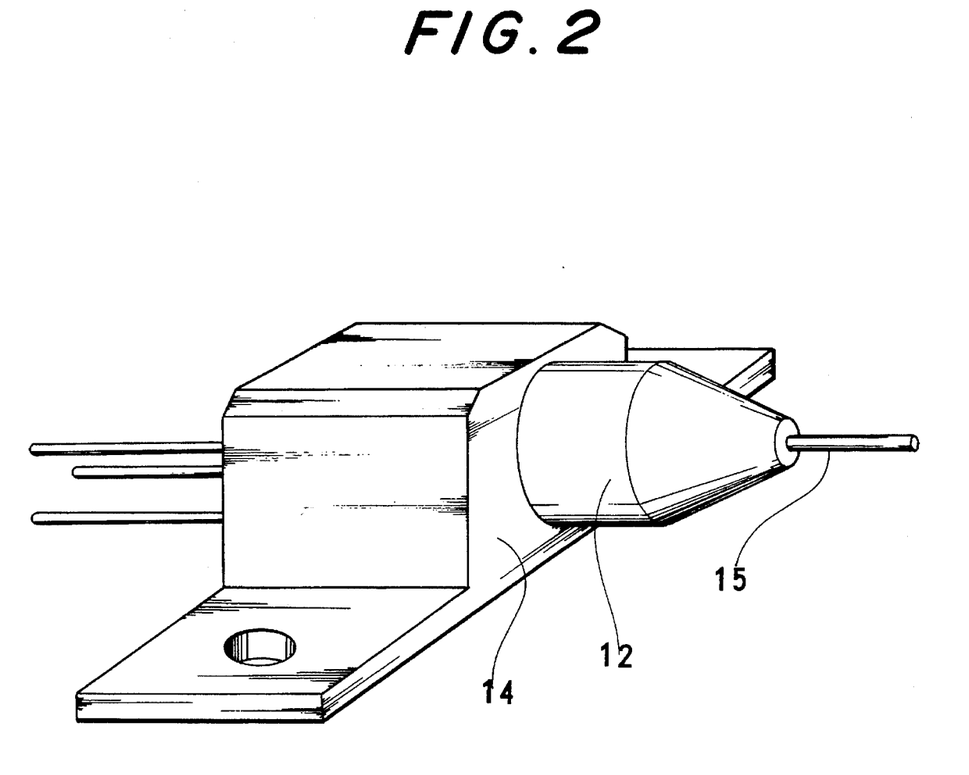
FIG. 2 is a perspective side view of the analog PD module of the embodiment.

An embodiment is explained by referring to FIG. 1 and FIG. 2. FIG. 1 is an oblique view of a vertically sectioned analog photodiode module of an embodiment. FIG. 2 is a perspective view of the appearance of the PD module. A package (1) is a general-purpose package of a 5.6 mm diameter with three lead pins (2). The pins (2) consists of a ground (case) pin (21) connected to the package, a cathode pin (22) and an anode pin (23).

A submount (4) is fixed at the center of the upper surface of the package (1) with a AuGe solder which is an alloy of Au and Ge. The submount (4) is a rectangular plate of 1.0 mm×1.5 mm×0.3 mm made of alumina $Al_2O_3$, an insulator. Both surfaces are plated with Ni/Au alloy.

A photodiode chip (3) is die-bonded at the center of the submount (4) with a SnPb solder. The photodiode has an n-type substrate, n-type layers and a p-type region formed on the n-type layers. The submount (4) electrically insulates the photodiode chip (3) from the package (1).

Actually the submount (4) is first fixed on the package and then the PD chip (3) is die-bonded on the submount (4). After the PD chip (3) has been bonded, the chip (3) and the submount (4) are electrically connected to the pins (22) and (23) by Au wires of a 20 μm diameter. An Au wire joins the cathode pin (22) with the top surface of the submount (4). The other Au wire connects the anode pin (23) to an anode electrode of the photodiode chip (3).

A metal cap (6) having a ball lens (5) at the center is welded at the most suitable spot of the package (1), after the position of the cap has been adjusted by some means to the spot which gives the PD chip the largest DC sensitivity. The inner space in the cap is filled with dry nitrogen gas and the cap (6) is airtightly fixed to the package (1). The ball lens (5) has a diameter of 1.5 mm in the embodiment. The whole surface of the lens (5) is covered with an antireflection coating. Of cource, a ball lens without antireflection coating is also available at some expense of sensitivity.

After the cap (6) has been fitted on the package (1), a ring spacer (7) is welded around the side surface of the package (1) by a YAG laser. A ferrule (9) is fitted at an end of a single-mode fiber (8). The front surface of the ferrule (8) is polished slantingly at eight degrees for preventing the beams reflected at the end from returning to the laser.

The ferrule (9) is inserted into a central hole perforated in an axial direction in a ferrule holder (10). The PD chip (3) and the ball lens (5) align along a center line. The fiber must be positioned at an extension of the center line defined by the chip (3) and the lens (5). The optimum spot is sought for the end of the fiber (8) by displacing the holder (10) in the horizontal plane and by displacing the ferrule (9) in the axial direction.

Figure 6:
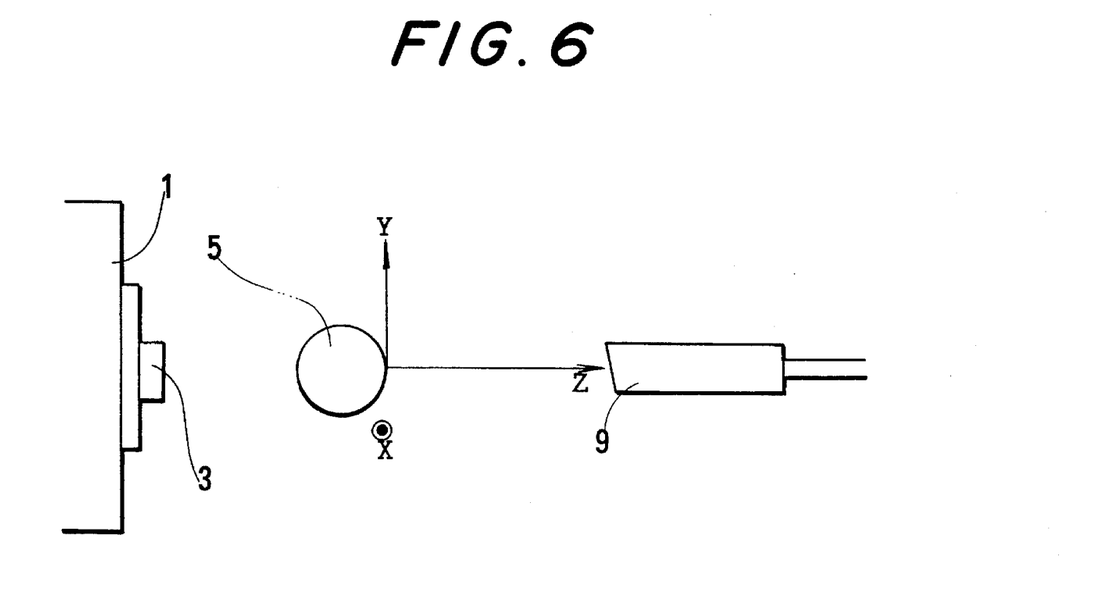
FIG. 6 is a schematic view of the components of a PD module for explaining the method of adjustment of the fiber end.

The adjustment of the fiber will be done by the following steps. FIG. 6 demonstrates the way of adjustment of the centers. The adjustment means to determine the relative positions of the photodiode (3) mounted on the package (1), the ball lens (5) on the cap (6) and the fiber end held by the ferrule (9).

The package (1) sealed by the cap (6), the ferrule holder (10) and the ferrule (9) are individually fitted to three-axis adjusters of a YAG welding machine. The three-axis adjusters keep the three parts in a manner which allows the three to move in three directions independently.

A reverse bias of 5 V is applied to the photodiode chip (3) through bias tees from a power source. Further the bias tees enable to monitor the DC component and the AC component of a photocurrent flowing in the PD chip. A plurality of lasers (not shown in the figures) are installed at the other end of the fiber (8) for introducing the light beams into the farther end. The beams from the lasers travel in the fiber, go out of the end of the fiber, converge in the lens (5) and attain the photodiode (3). Two laser diodes are adopted instead of one laser, since the adjuster must investigate the non-linearlity induced from a mixture of plural modulation frequencies as well as the sensitivity. In the example, one laser is modulated by 247.25 MHz and the other laser is modulated by 253.25 MHz. Modulation ratios are 50% for both lasers. The difference of the modulation frequencies is 6 MHz.

The beams from two lasers are unified into one flux by a photocoupler. The beam flux is turned down to 0.5 mW by an optical attenuator. The beam flux is introduced into the farther end of the fiber. The beam flux travels in the fiber, emerges from the fiber end, passes through the lens (5) and irradiates the PD (3). The holder (10) is moved in XY-plane on the package for seeking the point which ensures the maximum power incidence for the PD at a lens-fiber distance Z. The ferrule (9) is displaced in the axial hole of the holder (10) for searching the point at which the maximum power enters the PD. In practice, the adjustments in XY-plane are independently done at all points Z. First, the ferrule is temporarily fixed in the holder at a certain lens-fiber distance Z. Then the holder is moved in XY-plane for searching the point of the maximum power incidence at the value Z. The power and the distortion are measured at the point. The values are denoted as a function of Z-coordinate. Namely, the sensitivity R(Z) means the maximum sensitivity for the height Z among all points in XY-plane. According to the manner, the point $Z_0$ which gives the maximum DC sensitivity is sought. The point of the maximum $R_{DC}$ is $Z_0=1.1$ mm in the example.

The measurements are repeated in both directions from the maximum $R_{DC}$ point ($Z_0=1.1$ mm) at intervals of 0.05 mm. At any Z value, the holder is moved in XY-plane for realizing the incidence of the maximum power and then the $R_{DC}(Z)$, $R_{AC}(Z)$ and $IMD_2(Z)$ are measured. FIG. 4 exhibits the results of the measured $R_{DC}(Z)$ and $R_{AC}(Z)$. The abscissa is the lens-fiber distance Z. The ordinate is the sensitivity R (A/W) both for the $R_{AC}$ and $R_{DC}$. Square dots denote the AC sensitivity $R_{AC}$. Round dots designate the DC sensitivity $R_{DC}$. The $R_{AC}$ and $R_{DC}$ have plateaus. The $R_{AC}(Z)$ takes the maximum value in a wide range from 0.8 mm to 1.3 mm of Z. The maximum range of the $R_{DC}(Z)$ is also between 0.8 mm and 1.35 mm. Beyond the maximum plateau, the $R_{AC}$ falls more rapidly than the $R_{DC}$. $Z_0=1.1$ mm is the middle of the maximum range (plateau) of the $R_{DC}$ in FIG. 4.

FIG. 3 shows the $R_{AC}$ (square dots) and the $IMD_2$ (round dots). The right ordinate denotes the $IMD_2$ in dBc. The left ordinate denotes the $R_{AC}$ in the unit of A/W. The AC sensitivity $R_{AC}$ takes the maximum in the range of a 0.5 mm length between 0.8 mm and 1.3 mm. The $R_{AC}$ decreases quickly before or behind the range.

The second order distortion $IMD_2$ takes the biggest value at a point $Z_m=1.4$ mm. The top point $Z_m$ of $IMD_2$ does not exist just at the middle ($Z_0$) of the range of the maximum sensitivity but deviates from the middle ($Z_0$) toward the right. The fact is simply signified by an inequality $Z_0<Z_m$. The asymmetry between the $R_{AC}$ and the $IMD_2$ is important. The $IMD_2$ has no wide plateau near $Z_m$ unlike the $R_{AC}$. The $IMD_2$ falls swiftly from the top value, as Z deviates from $Z_m$ in both directions. However the fall of $IMD_2$ is asymmetric to the left and to the right. In the right of $Z_m$, the $IMD_2$ fast sinks monotonously. In the left, the $IMD_2$ once descends till the minimum −79 dBc at the minimum point $Z_4=0.8$ mm, as the lens-fiber distance decreases. But the $IMD_2$ rises again from $Z_4$.

Any one had neither considered that the $IMD_2$ should fall before the maximum $R_{AC}$ point $Z_0$ nor tried to measure the $IMD_2$ in the range ($Z<Z_0$) before $Z_0$. The Inventors have measured the $IMD_2$ also in the region before the maximum AC sensitivity point $Z_0$ and have found out the fact that there is some region before $Z_0$ in which the $IMD_2$ diminishes. FIG. 3 shows that the $IMD_2$ is less than $-75$ dBc in the region between $Z_2$ and $Z_5$ which are closer to the lens than $Z_0$.

The points $Z_2$ and $Z_3$ which give $-75$ dBc to the $IMD_2$ ($IMD_2(Z)=-75$ dBc) exist on both sides of the $IMD_2$ curve with regard to $Z_0$. However the peak $Z_m$ of $IMD_2$ is one-sided to the left in the sensitivity plateau. The left "$-75$ dBc" point $Z_2$ shall enjoy higher sensitivity than the right "$-75$ dBc" point $Z_3$ due to the bias of $Z_m$. In the example, the right "$-75$ dBc point" is $Z_3=1.6$ mm which has the $R_{AC}$ of 0.88 A/W. The left "$-75$ dBc" point is $Z_2=0.9$ mm which gives the $R_{AC}$ the maximum value of 0.96 A/W. Prior devices selected the farther point $Z_3$ as the critical point which satisfied the requirement of the $IMD_2$ for the first time and settled the fiber end at $Z_3$ or at the point farther than $Z_3$.

Although $Z_2$ (0.9 mm) and $Z_3$ (1.6 mm) are equally capable of reducing the $IMD_2$ down to $-75$ dBc, the sensitivity differs by about 9% for $Z_2$ and $Z_3$. The former point $Z_2$ is superior by 9% in sensitivity to the latter counterpart $Z_3$. Conventional devices employed $Z_3$ as the spot of the end of a fiber, because they were not aware of the existence of $Z_2$. By contrast, the present invention adopts the former point $Z_2$ as the position of the fiber end.

The embodiment fixes the fiber end at a point $Z_1=0.80$ mm ($IMD_2=-78$ dBc), allowing a margin of 0.1 mm for ensuring the $IMD_2$ less than $-75$ dBc. Actually the ferrule (9) is welded at the spot (13) to the holder (10) by a YAG laser. Therefore the present invention displaces the fiber closer to the lens by 0.8 mm than the prior one. The conspicuous access of the fiber can easily be discerned at a glimpse of FIG. 1 and FIG. 7.

Then the position of the holder (10) is again adjusted in XY-plane for seeking the maximum AC sensitivity point. At the position, the holder (10) is YAG-welded to the ring spacer (7). Finally the ferrule holder (10) is encrusted with a bend limiter (12) which is made from an elastic material. The bend limiter (12) protects the fiber from being broken. Thus an assembly of an analog photodiode module is completed.

The $IMD_2$ and the $R_{AC}$ of the embodiment are measured by the same measuring apparatus which has used for adjusting the holder and the ferrule. The $IMD_2$ is $-78.5$ dBc and the $R_{AC}$ is 0.96 A/W for the embodiment. The value 0.96 A/W is just the maximum $R_{AC}$. $Z_1$ is a favorable point which enables the low $IMD_2$ to be compatible with the maximum $R_{AC}$.

For the purpose of comparison, a PD module which has been adjusted by the prior method is also examined by the same measuring apparatus. The prior module shows $IMD_2=-78$ dBc and $R_{AC}=0.87$ A/W. Although the $IMD_2$s are similar to each other, the present invention surpasses the prior one in the $IMD_2$ by about 0.09 A/W (nearly 10% or 0.85 dBNV). The higher sensitivity raises the S/N ratio higher than the prior one.

In FIG. 3, the crossing points of a line $IMD_2(Z)=-75$ dBc with the $IMD_2$ curve are $Z_5$, $Z_2$ and $Z_3$. The segment $Z_5Z_2$ is the upper limit of allowable $IMD_2$s. The range including $Z_2$, $Z_1$, $Z_4$ and $Z_5$ gives $IMD_2$s less than $-75$ dBc. Any $Z$ between $Z_5=0.5$ mm and $Z_2=0.86$ mm may be a candidate for the position of the fiber end from the standpoint of the $IMD_2$.

But the sensitivity must also be considered for determining the position. The prior point $Z_3$ gives a sensitivity $R_{AC}=0.87$ A/W. $Z_7$ is defined as a point which gives $R_{AC}=0.87$ A/W before $Z_0$. In the example, $R_{AC}$ is higher than 0.87 A/W in the range between $Z_7=0.65$ mm and $Z_2=0.86$ mm which satisfies the requirement of $IMD_2<-75$ dBc. Thus all the points between $Z_7=0.65$ mm and $Z_2=0.86$ mm are superior to the conventional $Z_3$, because the range shows higher sensitivity (more than 0.87 A/W) than the conventional position $Z_3$. Then all the points between $Z_7=0.65$ mm and $Z_2=0.86$ mm are also promising for the spot of the fiber end. The present invention generally takes all the points from $Z_7=0.65$ mm to $Z_2=0.86$ mm as the position of the fiber end, besides $Z_1=0.80$ mm. The points of the region can further suppress the distortion at a little expense of sensitivity.

However, the parameters are inherent to this example. More general definition of the scope of preferable $Z$ is required. The maximum AC sensitivity $R_{AC}$ is 0.96 A/W between $Z=0.8$ mm and $Z=1.3$ mm (middle point $Z_0=1.1$ mm). The maximum sensitivity can be represented as $R_{AC}(Z_0)$ by the value of the middle $Z_0$ in the range. The $R_{AC}$ at the prior $Z_3$ is 0.87 A/W. The ratio of $R_{AC}(Z_3)/R_{AC}(Z_0)$ is 0.9. Thus the range from $Z_7=0.65$ mm to $Z_2=0.86$ mm can generally be defined by inequalities $0.9 \leq R_{AC}(Z)/R_{AC}(Z_0) \leq 1.0$. All the points satisfying the inequality are superior to the prior $Z_3$ both in the $R_{AC}$ and the $IMD_2$. This is the definition of the present invention by the AC sensitivity.

The same requirement shall be defined by the DC sensitivity. FIG. 4 shows the relation between the $R_{AC}$ and the $R_{DC}$. The decrease of the $R_{DC}$ is slightly slower than the decrease of the $R_{AC}$. The prior point $Z_3=1.6$ mm has the $R_{DC}=0.88$ A/W. The maximum of $R_{DC}(Z_0)$ is 0.96 A/W. Then the ratio $R_{DC}(Z_3)/R_{DC}(Z_0)$ is 0.92. Then the scope of preferable $Z$ ($Z_7=0.65$ mm to $Z_2=0.86$ mm) of the present invention can be generally defined by an inequality $0.92 \leq R_{DC}(Z)/R_{DC}(Z_0) \leq 1.0$.

With regard to the package, various size, pin number and shape of packages are available besides the general-purpose three-pin package of 5.6 mm$\phi$. Arbitrary other solders can be used to bond the submount to the package and the chip to the submount besides AuGe or SnPb which is employed in the embodiment. Aluminum wires or copper wires can replace gold wire for connecting the electrodes, the submount, the package and the pins. The ball lens can also be replaced by a half-ball lens or a selfoc-lens which has enough aberration to separate the maximum sensitivity point from the maximum distortion point. The use of the submount is not essential to the present invention. The photodiode chip can otherwise be mounted directly on the surface of the package. The present invention allows various changes of design, parts, sizes or shapes beyond the embodiments without changing the substance of the invention.

What I claim is:

1. An analog photodiode module comprising:

an optical fiber having an end for transmitting light beams including a plurality of amplitude-modulated signals of different frequencies;

a lens for converging the light beams emitted from the optical fiber; and a photodiode for receiving the light beams converged by the lens and converting the light beams to electric signals;

wherein the end of the fiber is positioned at a point ($Z_1$) which is closer to the lens than a middle point ($Z_0$) of a maximum sensitivity range to effect a second order distortion $IMD_2$ lower than a predetermined value; and wherein AC sensitivity $R_{AC}(Z_0)$ at the middle point ($Z_0$) and AC sensitivity $R_{AC}(Z_1)$ at the point ($Z_1$) satisfy an inequality $0.9 \leq R_{AC}(Z_1)/R_{AC}(Z_0) \leq 1.0$.

2. An analog photodiode module as claimed in claim 1, further comprising:

a package for holding the photodiode;

a cap for sealing the package and supporting the lens;

a ferrule for holding the end of the optical fiber; and a holder for fixing the ferrule to the package.

3. An analog photodiode module comprising:

an optical fiber having an end for transmitting light beams including a plurality of amplitude-modulated signals of different frequencies;

a lens for converging the light beams emitted from the optical fiber; and a photodiode for receiving the light beams converged by the lens and converting the light beams to electric signals;

wherein the end of the fiber is positioned at a point ($Z_1$) which is closer to the lens than a middle point ($Z_0$) of a maximum sensitivity range to effect a second order distortion $IMD_2$ lower than a predetermined value; and wherein the photodiode has a receiving region wider than a least-confusion circle of the beams converged by the lens, and a sensitivity curve as a function of a lens-fiber distance has a wide maximum sensitivity range.

4. An analog photodiode module as claimed in claim 3, further comprising:

a package for holding the photodiode;

a cap for sealing the package and supporting the lens;

a ferrule for holding the end of the optical fiber; and a holder for fixing the ferrule to the package.

5. An analog photodiode module comprising:

an optical fiber having an end for transmitting light beams including a plurality of amplitude-modulated signals of different frequencies;

a lens for converging the light beams emitted from the optical fiber; and a photodiode for receiving the light beams converged by the lens and converting the light beams to electric signals;

wherein the end of the fiber is positioned at a point ($Z_1$) which is closer to the lens than a middle point ($Z_0$) of a maximum sensitivity range to effect a second order distortion $IMD_2$ lower than a predetermined value $IMD_2$ of $-75$ dBc.

6. An analog photodiode module as claimed in claim 5, wherein a maximum distortion point ($Z_m$) is distanced from the lens farther than the middle point ($Z_0$) of the maximum sensitivity range.

7. An analog photodiode module as claimed in claim 6, wherein a point ($Z_1$) which exists in the maximum sensitivity range gives the $IMD_2$ less than the predetermined value and the fiber end is positioned at the point ($Z_1$).

8. An analog photodiode module as claimed in claim 7, wherein the fiber end is positioned at a point between a first critical point ($Z_5$) and a second critical point ($Z_2$) which are closer to the lens than the middle point ($Z_0$) and give the predetermined $IMD_2$.

9. An analog photodiode module as claimed in claim 8, wherein the fiber end is positioned at a point between a first point ($Z_7$), which is closer to the lens than the middle point ($Z_0$) and gives an $R_{AC}(Z_7)=0.9\ R_{AC}(Z_0)$, and the second critical point ($Z_2$), which is closer to the lens than the middle point ($Z_0$) and gives the predetermined $IMD_2$.

10. An analog photodiode module as claimed in claim 5, further comprising:

a package for holding the photodiode;

a cap for sealing the package and supporting the lens;

a ferrule for holding the end of the optical fiber; and a holder for fixing the ferrule to the package.

11. An analog photodiode module as claimed in claim 10, wherein the lens is a ball lens and is coated with an antireflection coating film.

12. An analog photodiode module as claimed in claim 11, wherein the photodiode is die-bonded on a submount which has been fixed to the package.

13. An analog photodiode module as claimed in claim 12, wherein the submount is a rectangular insulator having a metallized top surface and a metallized bottom surface.

14. An analog photodiode module as claimed in claim 13, wherein the ferrule and the fiber are slantingly polished at the end for preventing reflected light beams from returning to a light source.

15. An analog photodiode module as claimed in claim 14, wherein the ferrule and the fiber are slantingly polished at the end at eight degrees.

16. An analog photodiode module as claimed in claim 15, wherein the cap is fixed to the package by YAG-laser welding.

17. An analog photodiode module as claimed in claim 16, wherein the holder is fixed to a package by YAG-laser welding.

18. An analog photodiode module as claimed in claim 17, wherein the package has a 5.6 mm diameter.

19. An analog photodiode module as claimed in claim 18, wherein the ball lens has a diameter of 1.5 mm.

20. An analog photodiode module as claimed in claim 19, wherein the light receiving layer is made from InGaAs.

21. An analog photodiode module as claimed in claim 20, wherein the photodiode module is required to respond to carriers faster than 1.5 GHz with an $IMD_2$ less than $-75$ dBc.

22. An analog photodiode module as claimed in claim 21, wherein the photodiode module is required to sense the light of a wavelength between 1.0 μm and 1.6 μm.

23. An analog photodiode module as claimed in claim 22, wherein the optical fiber is protected from excess bending by a bend limiter made from an elastic material.

24. An analog photodiode module comprising:

an optical fiber having an end for transmitting light beams including a plurality of amplitude-modulated signals of different frequencies;

a lens for converging the light beams emitted from the optical fiber; and a photodiode for receiving the light beams converged by the lens and converting the light beams to electric signals;

a package for holding the photodiode;

a cap for sealing the package and supporting the lens;

a ferrule for holding the end of the optical fiber; and a holding for fixing the ferrule to the package, wherein the end of the fiber is positioned at a point ($Z_1$) which is closer to the lens than a middle point ($Z_0$) of a maximum sensitivity range to effect a second order distortion $IMD_2$ lower than a predetermined value.

25. An analog photodiode module comprising:

an optical fiber having an end for transmitting light beams including a plurality of amplitude-modulated signals of different frequencies;

a lens for converging the light beams emitted from the optical fiber; and a photodiode for receiving the light beams converged by the lens and converting the light beams to electric signals;

wherein the end of the fiber is positioned at a point ($Z_1$) which is closer to the lens than a middle point ($Z_0$) of a maximum sensitivity range to effect a second order distortion $IMD_2$ lower than a predetermined value; and wherein DC sensitivity $R_{DC}(Z_0)$ at the middle point ($Z_0$) and DC sensitivity $R_{DC}(Z_1)$ at the point ($Z_1$) satisfy an inequality $0.92 \leq R_{DC}(Z_1)/R_{DC}(Z_0) \leq 1.0$.

* * * * *